United States Patent Office 2,837,576
Patented June 3, 1958

2,837,576

DICHLOROMETHYLALLYLPHENOLS

Donald G. Kundiger, Manhattan, Kans., and Huey Pledger, Jr., Midland, Mich., assignors to The Dow Chemical Company, Midland, Mich., a corporation of Delaware No Drawing. Application May 28, 1956
Serial No. 587,468

7 Claims. (Cl. 260—623)

This invention is concerned with dichloromethylallylphenols and is particularly directed to compounds having the formula

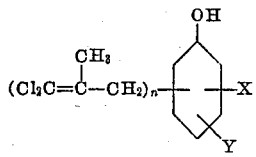

wherein $n$ is an integer equal to 1 or 2 and X and Y each represent hydrogen, chlorine, bromine or an alkyl radical containing from 1 to 4 carbon atoms, inclusive, and to a method for preparing certain of the compounds.

The novel dichloromethylallylphenols are oily liquids or crystalline solids, somewhat soluble in many organic solvents and in strong aqueous alkali solutions and substantially insoluble in water. The new compounds have been found useful as parasiticides for the control of bacterial and fungal organisms and mite and insect pests.

The new compounds may be prepared by various methods. In one method for such preparation, 1,1,3-trichloro-2-methyl-1-propene or 3,3,3-trichloro-2-methyl-1-propene is reacted with a phenol of the formula

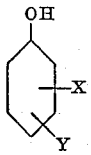

wherein X and Y have the aforementioned significance, in the presence of anhydrous aluminum chloride or ferric chloride as a catalyst. In such operations the phenol and catalyst are mixed and heated to a temperature of from about 40° to 150° C. and the trichloromethylpropene reactant added thereto portionwise. The reaction serves for the production of both mono- and di-(3,3-dichloro-2-methylallyl)phenols. The production of the mono- or di-(substituted)phenol as a major product is controlled to a considerable extent by regulating the proportions of the reactants. Thus, the use of a molar excess of the phenol reactant favors the production of mono-(dichloromethylallyl)phenol products while a molar excess of the trichloromethylpropene reactant favors production of di-(dichloromethylallyl)phenol products.

When employing the above method, the crude product is mixed with ice and concentrated hydrochloric acid to decompose catalyst complexes, and the resulting mixture extracted with a suitable water-immiscible organic solvent such as ether or benzene. The extract is then fractionally distilled to separate the desired dichloromethylallylphenol product. The latter, if a solid, may be further purified by recrystallization from organic solvents.

In a further method for producing the mono-(dichloromethylallyl)phenols, one molar proportion of 1,1,3-trichloro-2-methyl-1-propene is mixed with at least one molar proportion of phenol starting material as set forth above and heated at a temperature of from 120° to 200° C. On completion of the reaction, unreacted starting materials are recovered and the desired dichloromethylallylphenol separated by fractional distillation under reduced pressure. This method has the advantage of not requiring intermediate treatment with ice, hydrochloric acid and extraction solvent before the distillation.

In a preferred method for producing the mono-(dichloromethylallyl)phenols, one molar proportion of 3,3,3-trichloro-2-methyl-1-propene is mixed with at least one molar proportion of phenol starting material and heated to a reaction temperature of from 40° to 90° C. In general, reaction is initiated readily at such temperatures and proceeds with the evolution of heat and hydrogen chloride. This preferred mode of preparation has the advantages of operating at lower temperatures and producing smaller proportions of resinous by-products than the other methods, as well as avoiding intermediate treatment with ice, hydrochloric acid and extraction solvents. On completion of the reaction the crude product is submitted to fractional distillation under reduced pressure to obtain the desired dichloromethylallylphenol.

The following examples illustrate the invention but are not to be construed as limiting the same.

*Example 1*

188.2 grams (2 moles) of phenol and 159.5 grams (1 mole) of 1,1,3-trichloro-2-methyl-1-propene were mixed and heated for seven hours at temperatures of from 143° to 167° C. under reflux. On completion of the reaction, as evidenced by a marked decrease in the rate of evolution of hydrogen chloride of reaction, the reaction mixture was distilled under reduced pressure to recover 20 grams of unreacted 1,1,3-trichloro-2-methyl-1-propene and 108.4 grams of unreacted phenol and to separate fractions boiling at from 120° C. at 1.2 millimeters pressure to 145° C. at 0.7 millimeter pressure and containing a 2-(3,3-dichloro-2-methylallyl)phenol product and a 4-(3,3,-dichloro-2-methylallyl)phenol product. The latter crystallized as a solid from the higher boiling fractions and crystals thereof were employed to seed the intermediate fractions, thereby inducing crystallization. The resulting crystals were separated by filtration and the filtrates combined with the lower boiling fractions and redistilled to obtain the 2-(3,3-dichloro-2-methylallyl)phenol product as a liquid, characterized by a boiling point of 120°–122° C. at 1.0 to 1.2 millimeters pressure and a refractive index ($n$/D) of 1.569 at 20° C. The crystalline products were combined and recrystallized from petroleum ether to obtain the 4-(3,3-dichloro-2-methylallyl)phenol product as a crystalline solid, characterized by a melting point of 95–96° C.

*Example 2*

94.1 grams (1 mole) of phenol and 159.5 grams (1 mole) of 3,3,3-trichloro-2-methyl-1-propene were mixed and heated to a temperature of 65° C. Vigorous reaction was initiated with rapid evolution of hydrogen chloride and the temperature of the reaction mixture rose without further external heating to a maximum of 90° C. in a period of 20 minutes. Thereafter the mixture was heated at 90° C. for a further 20 minute period and then fractionally distilled under reduced pressure to recover 62.6 grams of unreacted trichloromethylpropene and 45.14 grams of unreacted phenol and to separate a 2-(3,3-dichloro-2-methylallyl)phenol product and a 4-(3,3-dichloro-2-methylallyl)phenol product as in the preceding example.

*Example 3*

To 24.4 grams (0.25 mole) of phenol in molten condition was added 10 grams (0.07 mole) of anhydrous aluminum chloride portionwise with stirring. To the resulting mixture 40 grams (0.25 mole) of 1,1,3-trichloro- 2-methyl-1-propene was added portionwise over a period of 35 minutes while maintaining the mixture at temperatures of from 55° to 60° C. Following the addition, the mixture was maintained at 55°–60° C. for 15 minutes, and thereafter cooled and poured into a mixture of crushed ice and concentrated hydrochloric acid. Ether was added to the resulting mixture which thereupon separated into two layers. The ether layer was decanted and the aqueous layer extracted further with ether. The ether layer and ether extracts were combined and distilled to recover ether and to separate a mixture of 2-(3,3-dichloro-2-methylallyl)phenol and 4-(3,3-dichloro-2-methylallyl)phenol from which the latter was crystallized and separated by filtration as in the preceding examples.

*Example 4*

257.2 grams (2 moles) of p-chlorophenol and 53.2 grams (0.4 mole) of anhydrous aluminum chloride were mixed together at 45°–50° C. and 319 grams (2 moles) of 1,1,3-trichloro-2-methyl-1-propene added thereto portionwise with stirring during a period of 1.5 hours while heating the mixture at temperatures of 65°–70° C. Thereafter the mixture was heated at 70° C. for an additional 15 minutes, cooled and poured into a mixture of crushed ice and concentrated hydrochloric acid. The resulting mixture was extracted with ether and distilled as in Example 3. A further fractional distillation under reduced pressure separated: (1) a 4-chloro-2-(3,3-dichloro-2-methylallyl)phenol product, characterized by a boiling point of 118°–120° C. under 0.1 millimeter pressure and a refractive index ($n/D$) of 1.579 at 20° C. and (2) a 4-chloro-2,6-di-(3,3-dichloro-2-methylallyl)phenol product, boiling at 163.5°–172° C. under 0.15 millimeters pressure and having a refractive index ($n/D$) of 1.585 at 20° C.

*Example 5*

13.3 grams (0.1 mole) of anhydrous aluminum chloride and thereafter 159.5 grams (1 mole) of 3,3,3-trichloro-2-methyl-1-propene were added portionwise with stirring to 216.2 grams (2 moles) of p-cresol. The latter addition was carried out over a period of 40 minutes while maintaining the mixture at temperatures of 40°–45° C. Vigorous exothermic reaction occurred and cooling was required to maintain the desired reaction temperature. On completion of the addition, the mixture was maintained at 40°–45° C. for a further 70 minutes until the evolution of hydrogen chloride had substantially ceased. The reaction mixture was cooled, poured into a mixture of ice and concentrated hydrochloric acid, extracted and distilled as in Example 3 to recover 22.9 grams of 1,1,3-trichloro-2-methyl-1-propene and 170.1 grams of unreacted p-cresol and to separate 106 grams of crude reaction product as a liquid, boiling at 113.5°–127° C. under 0.5 millimeter pressure. The latter was again fractionally distilled with the center cut crystallizing on cooling. Portions of the crystalline solid were employed to seed the other fractions to induce crystallization. The resulting crystalline masses were separated by filtration and recrystallized from petroleum ether to obtain a 4-ethyl-2-(3,3-dichloro-2-methylallyl)phenol product, melting at 52.5°–53.7° C.

*Example 6*

108.1 grams (1 mole) of p-cresol and 159.5 grams (1 mole) of 3,3,3-trichloro-2-methyl-1-propene were mixed and heated gradually to 78° C. Reaction was initiated with the evolution of hydrogen chloride and the temperature of the mixture maintained itself in the range of 78°–83° C. for a period of 20 minutes without external heating. The reaction mixture was then heated to a temperature of 187° C. for a period of 90 minutes. The resulting product was fractionally distilled under reduced pressure and the distillates seeded as in Example 5 to obtain the desired 4-methyl-2-(3,3-dichloro-2-methylallyl)phenol product as a crystalline solid.

*Example 7*

408.6 grams (3 moles) of 4-isopropylphenol and 159.5 grams (1 mole) of 1,1,3-trichloro-2-methyl-1-propene were mixed and heated at temperatures of from 155°–187° C. for 7 hours. The resulting crude product was fractionally distilled to recover unreacted starting materials and to separate a 4-isopropyl-2-(3,3-dichloro-2-methylallyl)phenol product as a liquid, characterized by a boiling point of 123° C. under 0.5 millimeter pressure, a refractive index ($n/D$) of 1.549 at 20° C. and a density (20°/4° C.) of 1.151.

*Example 8*

450.6 grams (3 moles) of 4-tertiarybutylphenol and 239.3 grams (1.56 moles) of 1,1,3-trichloro-2-methyl-1-propene were mixed and heated at temperatures of 154°–162° C. for 8 hours. The product was fractionally distilled to recover unreacted starting materials and to obtain a 4-tertiarybutyl-2-(3,3-dichloro-2-methylallyl)phenol product as a liquid, characterized by a boiling point of 128°–130° C. under 0.6 millimeters pressure, a refractive index ($n/D$) of 1.542 at 20° C. and a density (20°/4° C.) of 1.146. Infrared absorption spectra of the product were in agreement with the assigned structure.

*Example 9*

554.1 grams (3 moles) of 4-tertiarybutyl-2-chlorophenol (refractive index ($n/D$) of 1.532 at 20° C.) and 159.5 grams (1 mole) of 1,1,3-trichloro-2-methyl-1-propene were mixed and heated to 190° C. Little or no reaction, as evidenced by the evolution of hydrogen chloride, was observed. The mixture was then cooled to room temperature and 0.8 gram (0.005 mole) of anhydrous ferric chloride added. The resulting mixture was heated to a temperature of 140° C. for 12 hours. Reaction with the evolution of hydrogen chloride ensued. The reaction mixture was fractionally distilled to recover unreacted starting materials and to obtain a crude product boiling at from 105° C. under 0.6 millimeter pressure to 133° C. under 0.35 millimeter pressure. The latter was redistilled to obtain a 4-tertiarybutyl-2-chloro-6-(3,3-dichloro-2-methylallyl)phenol product boiling at 112.5°–118° C. under 0.15 to 0.2 millimeter pressure and having a refractive index ($n/D$) of 1.548 at 20° C.

*Example 10*

122.2 grams (1 mole) of 2,4-dimethylphenol and 26.7 grams (0.2 mole) of anhydrous aluminum chloride were mixed at 50° C. and 335 grams (2.1 moles) of 1,1,3-trichloro-2-methyl-1-propene added thereto portionwise with stirring at temperatures of 65°–70° C. during a period of 90 minutes. The reaction mixture was then maintained at 70° C. for a further period of 30 minutes. The crude product was worked up as in Example 4 to separate: (1) a 2-(3,3-dichloro-2-methylallyl)-4,6-dimethylphenol product, boiling at 135° C. under 0.5 millimeter pressure and having a refractive index ($n/D$) of 1.566 at 20° C. and (2) a 2,5-di-(3,3-dichloro-2-methylallyl)-4,6-dimethylphenol product, boiling at 194° C. under 0.9 millimeter pressure and having a refractive index ($n/D$) of 1.578 at 20° C.

In a similar fashion, 3,3,3-trichloro-2-methyl-1-propene is reacted with 4-bromophenol, 3,4-dichlorophenol and 2,4-ditertiarybutylphenol to produce 4-bromo-2-(3,3-dichloro-2-methylallyl)phenol, 3,4-dichloro-6-(3,3-dichloro-2-methylallyl)phenol and 2-(3,3-dichloro-2-methylallyl)-4,6-ditertiarybutylphenol, respectively.

Representative dichloromethylallylphenols of the invention were dispersed in sterile nutrient agar to prepare nutrient media containing one of the phenols at a concentration of 0.05 percent by weight. The resulting media were streaked with an active broth culture of *Staphylococcus aureus* and thereafter incubated for 48 hours at 35° C. On inspection after the above incubation period, the treated media were found to be completely free of growth of the Staphylcoccus organism. Similarly inoculated and incubated portions of the media without the inclusion of one of the dichloromethylallylphenols supported the growth of many colonies of the Staphylcoccus organism.

In further representative determinations, 4-tertiary-butyl-2-(3,3-dichloro-2-methylallyl)phenol, 4-chloro-2-(3,3-dichloro-2-methylallyl)phenol, 4-isopropyl-2-(3,3-dichloro-2-methylallyl)phenol and 2-(3,3-dichloro-2-methylallyl)phenol are separately dispersed in water to prepare a series of aqueous compositions containing 3 pounds of one of the phenols per 100 gallons of composition. The compositions are applied so as to thoroughly wet adult flies and American cockroach nymphs. Substantially 100 percent kills of the insect pests are obtained.

We claim:
1. Dichloromethylallylphenols having the formula

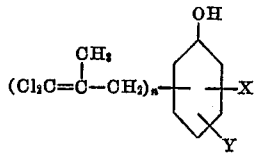

wherein $n$ represents an integer selected from 1 and 2, and X and Y each represent a member of the group consisting of hydrogen, chlorine, bromine and alkyl radicals containing from 1 to 4 carbon atoms, inclusive.
2. 2-(3,3-dichloro-2-methylallyl)phenol.
3. 4-(3,3-dichloro-2-methylallyl)phenol.
4. 4-tertiarybutyl-2-(3,3-dichloro-2-methylallyl)phenol.
5. 4-chloro-2-(3,3-dichloro-2-methylallyl)phenol.
6. 4-isopropyl-2-(3,3-dichloro-2-methylallyl)phenol.
7. A method for the preparation of mono-(3,3-dichloro-2-methylallyl)phenols which comprises reacting one molar proportion of 3,3,3-trichloro-2-methyl-1-propene with at least one molar proportion of a phenol of the formula

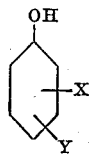

wherein X and Y are each selected from the group consisting of hydrogen, chlorine, bromine and alkyl radicals containing from 1 to 4 carbon atoms, inclusive, at a temperature of from about 40° to 90° C.

References Cited in the file of this patent
UNITED STATES PATENTS

| | | |
|---|---|---|
| 2,002,447 | Deichsel | May 21, 1935 |
| 2,122,581 | Niederl | July 5, 1938 |
| 2,666,771 | Zettlemoyer et al. | Jan. 19, 1954 |

OTHER REFERENCES

Niederl et al.: Jour. Amer. Chem. Soc., vol. 53, p. 3394 (1 page) (September 1931).

Hurd et al.: Jour. Amer. Chem. Soc., vol. 58 (November 1936), p. 2191 (1 page).

Kundiger et al.: Jour. Amer. Chem. Soc., vol. 78 (1956), pages 6101–04 (4 pages).